March 21, 1961
R. D. DOULL ET AL
2,975,452
DAUBER OR THE LIKE
Filed Dec. 11, 1958
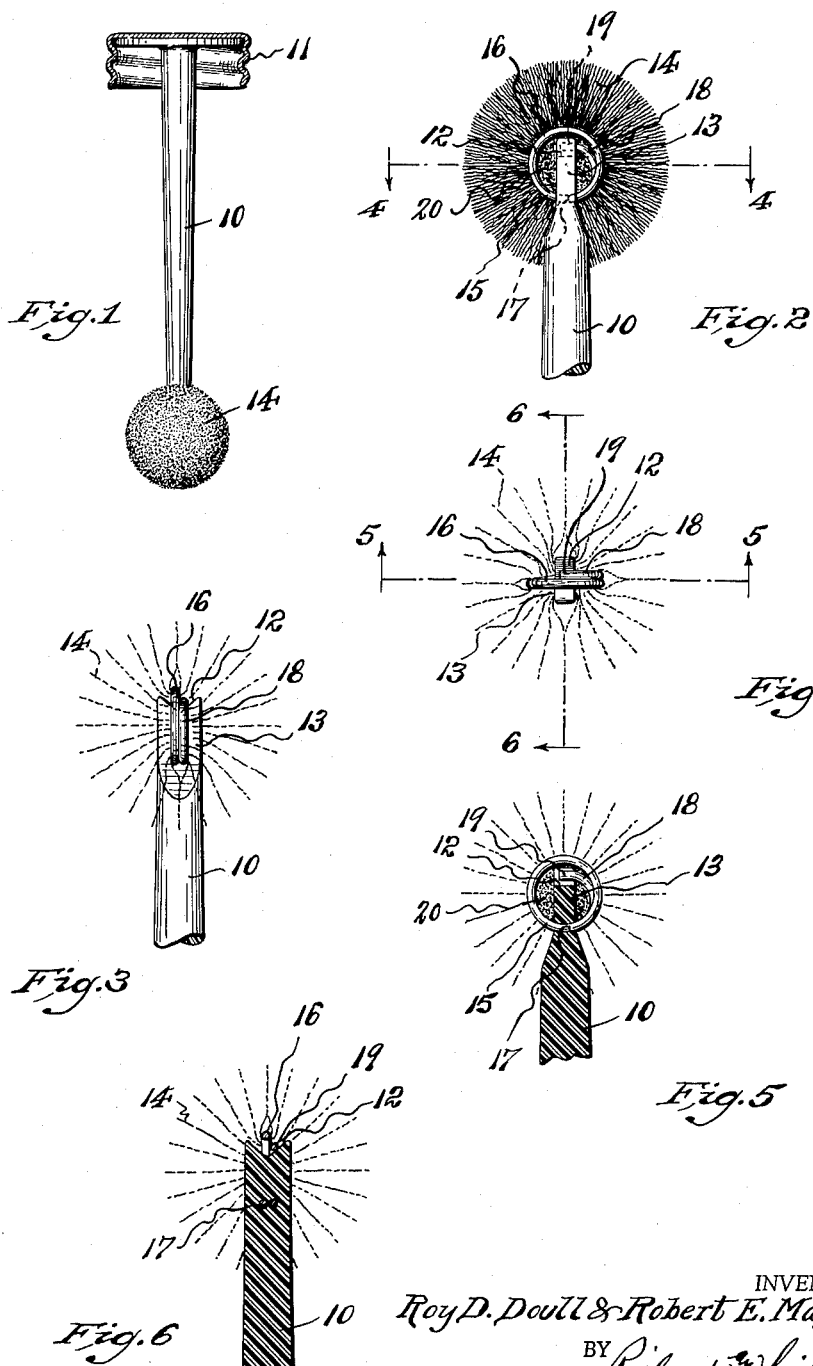
INVENTORS:
Roy D. Doull & Robert E. Magnuson,
BY Richards & Cifelli,
Attorneys

2,975,452

DAUBER OR THE LIKE

Roy D. Doull, Staten Island, N.Y., and Robert E. Magnuson, Packanack Lake, N.J.

Filed Dec. 11, 1958, Ser. No. 779,602

2 Claims. (Cl. 15—209)

This invention relates to improvements in daubers or like devices comprising a stem or handle to an end of which is affixed material suitable to form a dauber head, adapted to serve as an applicator for applying substances to surfaces desired to be treated therewith.

Many liquid substances, of varying viscosity, such as adhesives shoe blacking or whiting, dyes, and other substances suitable for particular treating effects, are commercially distributed in bottles, cans or like containers, which are equipped with removeable caps or like closures, the latter being provided with a stem, depending on the content of the container, and upon the end of which stem is mounted a dauber head, usually comprising filamentary material. In the manufacture of such dauber devices, the methods and means for attaching the dauber head material to the dauber stem have not been wholly satisfactory, for the reasons that symmetrical envelopment of the stem end by the dauber head material has not been practically achieved, and, for the further reason, that, when the dauber head is mounted on the stem by wire or staple attaching means, ends of the latter are likely to protrude from the dauber head material, with risk of scratching the surface to which the dauber head is applied in use.

Having the above in view, it is an object of this invention to provide a dauber device or the like having novel means for attaching dauber head material to the dauber stem or handle, whereby the dauber head material envelops the stem or handle end so as to form a symmetrical dauber head body in extension therefrom, and whereby the fastening means, by which the dauber head material is secured to the stem or handle, is imbedded centrally in the interior of the dauber head, and is so formed and related to the stem or handle that no sharp ends of the fastening means can protrude from the dauber head in use. By reason of this, no risk of scratching of a surface, to which the dauber head is applied in use, is involved.

The invention has for a further object to provide the dauber stem or handle with an end indenting notch, a helical dauber head fastening member or staple being provided, the body of which extends through the stem end portion and across the notch so as to embrace and imbed at least a portion of the dauber head material within the notch, whereby to bind said material therein against shifting movement, with one end of the fastening member or staple imbedded in the stem or handle and the other end thereof entered in the notch. By reason of this, said ends of the fastening member or staple cannot protrude through and externally of the dauber head, with risk of scratching a surface to which the dauber is applied in use. The attaching connection, thus provided between the dauber head material and the stem or handle, assures that the dauber head will be so formed or shaped as to provide a substantially globular dauber head body, which wholly surrounds the stem or handle end portion in enveloping relation thereto, and in such secured relation that displacement of the dauber head or deformation of its symmetrical globular formation is effectively prevented.

The above and other objects of this invention, not at this time more particularly pointed out, will become apparent from a reading of the following description of an illustrative embodiment thereof in connection with the accompanying drawings, in which:

Fig. 1 is a side elevational view of a dauber according to this invention, the stem or handle of which depends from a container closure cap, said cap being shown in section.

Fig. 2 is an enlarged fragmentary side elevational view of the stem or handle and of the fastening member or staple by which the dauber head material is secured to said stem or handle; Fig. 3 is a similar view, viewed from the right of Fig. 2, the dauber head material being indicated by broken lines; Fig. 4 is an end elevational view of the same; Fig. 5 is a vertical longitudinal sectional view, taken on line 5—5 in Fig. 4, the fastening member or staple being shown in elevation; and Fig. 6 is a vertical longitudinal sectional view, taken on line 6—6 in Fig. 4.

Similar characters of reference are employed in the above described views to indicate corresponding parts.

Referring to the drawings, the reference character 10 indicates the stem or handle of a dauber of the type adapted to be dependently attached to the closure cap of a container, the content of which can be removed by the dauber and applied thereby to a surface desired to be treated. The stem or handle 10 is suitably affixed to the container closure cap 11, so that said cap and stem or handle can be removed from the container (not shown), and used to manipulate the dauber in use, and, after use, returned to normal closing relation to the container.

The stem or handle member 10 can be made of any suitable material, such as plastic material, wood, glass, solid or tubular metal, etc., but is preferably made of a suitable plastic material.

The free end of the stem or handle 10 is provided with a crosswise indenting notch 12, and the free end portion of the stem or handle is preferably flattened, as at 13.

The dauber head 14 may be formed from any suitable material, but preferably from filamentary material, such as wool filaments, filaments of vegetable or other fibers, bristles, or the like. Such filaments or fibers are preferably initially bunched together in longitudinal parallel relation to provide a body thereof of suitable mass.

The means for affixing the dauber head material to the stem or handle 10, in mounted relation thereto, comprises a novel fastening member or staple, preferably formed from a suitable length of wire, which is wrought into a helical formation. The body 15 of this wire is passed transversely through the flattened end portion 13 of the stem or handle 10, so as to intersect the axis of said stem or handle below the notch 12. The wire being thus initially affixed to the stem or handle, the midportion of a mass or bunch of filamentary material comprising the dauber head 14, is caused to straddle the end portion 13 of the stem or handle, outwardly of the wire, with a portion of said mass or bunch crossing through the notch 12. The mass or bunch of filamentary material being thus disposed, one end portion of the wire body 15 is coiled around said mass or bunch of filamentary material to form an anchoring or clamping helix 16, the extremity 17 of which is forced into the material of the stem or handle 10. The opposite end portion of the wire body 15 is also coiled to form a helix 18, the end portion of which is inserted into the mass or bunch of filamentary material, so that its extremity 19 is enclosed within the notch 12 of the stem or handle 10. In this manner, the fastening member or staple constrictively embraces the midportion of the mass or body of the dauber head forming material, whereby to firmly embrace and clamp, and thus anchor the same in attached relation to the free end portion of the stem or handle 10. As so affixed to the stem or handle 10, the oppositely extending free end portions of the dauber head forming filamentary material will radiate in all directions from a constricted anchoring core 20 (see Figs. 2 and 5 more particularly), whereby the dauber head 14 will entirely surround the free end portion of the stem or handle 10 in enveloping relation thereto. It will thus be obvious that the free end portion of the stem or handle 10 is entered in the interior of the dauber head 14, so as to entirely envelope both said stem or handle end portion and the fastening member or staple. Due to this, and to the positioning of the fastening member or staple in a plane intersecting the axis of the stem or handle, the external surface of the dauber head is exposed in all directions, so that any part thereof is applicable to a surface to be treated thereby in use. This is a decided advantage over old methods of mounting dauber head material on a stem or handle, which heretofore usually comprised merely fastening said material to one side only of a stem or handle member.

It will also be observed, that due to the novel helical formation of the fastening member or staple of this invention, all sharp ends thereof are imbedded either in the stem or handle material or within the interior of the body mass of the dauber head, and consequently can not protrude exteriorly through and from the dauber head, with risk of scratching contact with a surface to which said dauber head is applied in use.

Since a portion of the core 20 of the dauber head material is compressed and firmly clamped, by the helices of the fastening member or staple, within the notch 12 of the stem or handle 10, the dauber head cannot shift relative to the stem or handle, and consequently its desired globular and stem or handle end enveloping formation cannot be easily deformed in use.

Although we have particularly described our invention as embodied in a dauber device in connection with a closure cap of a container, it will nevertheless be understood that the dauber head formation and the fastening member or staple therefor may well be applied to other types of devices. For example, mop and other heads can be affixed to a supporting and manipulating handle by the novel fastening member or staple according to this invention.

Having now described our invention, we claim:

1. A dauber device or the like comprising a handle stem having a crosswise notch indenting its free end, a dauber head comprising a mass of filamentary material, the mid portion of said mass being compressed to form a compacted central core from which the filaments radiate in all directions, the free notched end portion of the handle stem being inserted into the core of said dauber head, and a fastening member comprising a binding wire extending through the notched end portion of the handle stem below the core of the dauber head, one end portion of said binding wire being formed to provide a clamping helix encircling the core of the dauber head and terminating in an extremity imbedded endwise in the handle stem material thus binding the dauber head to the handle stem, the other end portion of said binding wire being formed to provide a second helix having its extremity inturned and inserted endwise into the core of the dauber head within the confines of the handle stem notch, all whereby extremities of the binding wire are confined and enclosed against external protrusion relative to the attached dauber head.

2. A dauber device according to claim 1, wherein the notched free end portion of the handle stem is flattened, and the binding wire helices extend in planes at a right angle to the plane of said flattened handle stem portion.

References Cited in the file of this patent

UNITED STATES PATENTS

| | | |
|---|---|---|
| 634,606 | Beeching | Oct. 10, 1899 |
| 1,503,062 | Pendergast | July 29, 1924 |
| 1,618,977 | Codina | Mar. 1, 1927 |